Patented May 17, 1949

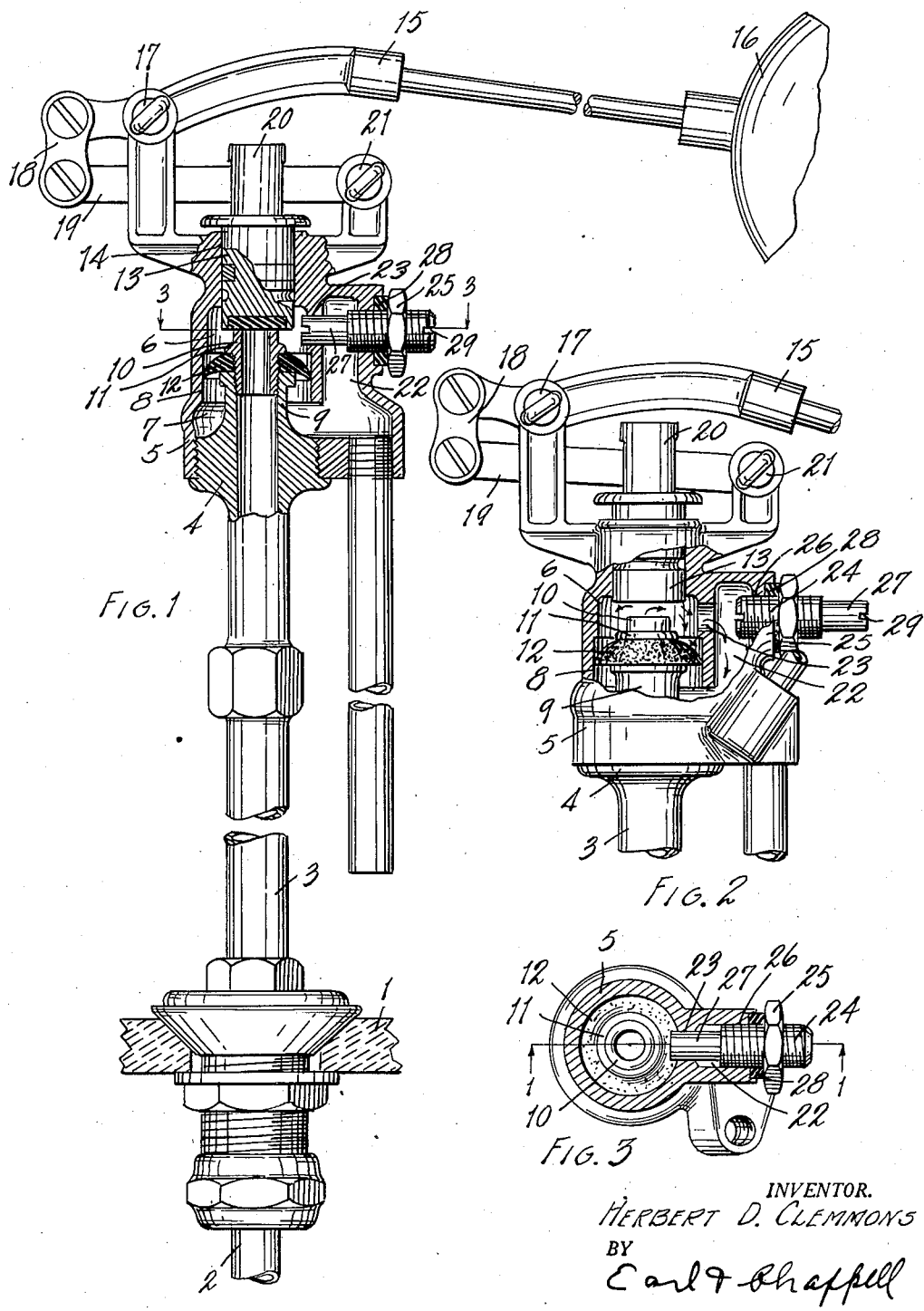

2,470,213

UNITED STATES PATENT OFFICE 2,470,213

VALVE MECHANISM

Herbert D. Clemmons, Sturgis, Mich., assignor to Scovill Manufacturing Company, Sturgis, Mich.

Application December 4, 1944, Serial No. 566,589

4 Claims. (Cl. 277—51)

This invention relates to improvements in valve mechanisms.

The main objects of this invention are:

First, to provide a valve mechanism well adapted for use as a flushing valve or as a ball cock which is quiet in operation, anti-siphoning in character and readily adapted for use on relatively high pressure systems or on low pressure systems.

Second, to provide a valve mechanism having these advantages which is compact and simple in structure and easily installed and adjusted.

Objects relating to details and economies of the invention will appear from the description to follow. The invention is defined and pointed out in the claims.

A preferred embodiment of the invention is illustrated in the accompanying drawing, in which:

Fig. 1 is a fragmentary view partially in elevation and partially in vertical section on line 1—1 of Fig. 3, the valve being shown in its closed position and the by-pass plug arranged to close the by-pass.

Fig. 2 is an enlarged fragmentary view partially in section on a line corresponding to the section line of Fig. 1 with the inlet valve open and the plug arranged to open the by-pass passage.

Fig. 3 is a view partially in horizontal section on line 3—3 of Fig. 1.

In the accompanying drawing, 1 represents the bottom of a flushing tank, 2 the water supply pipe, and 3 the riser therefor, the embodiment illustrated having an enlargement 4 onto which the valve body or casing 5 is threaded. This valve casing or body member has an inlet chamber 6 and a discharge chamber 7 having a cylindrically walled portion 8 aligned with the inlet chamber 6.

The inlet pipe has an extension 9 above the enlargement 4 projecting centrally into the chamber 8, a nipple 10 being threaded into the extension 7. This nipple has an annular flange 11 serving to clamp the resilient concavo-convex valve member 12 upon the end of the extension 7. This resilient member 12 constitutes a discharge and silencing valve, the water flowing downwardly around it from the inlet chamber and also serves as an anti-siphon valve or preventing back flow from the discharge chamber into the inlet chamber. The end of the nipple 10 constitutes a valve seat for the plunger inlet valve 13 which reciprocates in a suitable bore 14 provided therefor in the upper end of the valve body.

In this ball cock embodiment illustrated, the lever or arm 15 of the float 16 is pivoted at 17 and is connected by the link 18 to the valve lever 19 passing through a slot in the stem 20 of the valve 13 and pivoted at 21.

With this arrangement of parts, the water discharged from the inlet pipe into the inlet chamber flows downwardly through the cylindrical portion 8 of the discharge chamber, the valve 12 yielding to permit this flow and acting as a silencer and effectively preventing hissing and gushing noises as it substantially retards the flow. However, in the event of a back flow, the discharge valve is forced against the walls of the cylindrically walled portion of the discharge chamber.

The valve 12 is designed to act upon what is normally regarded as high pressures. Of course, it will be understood that it would work with a wide range of pressures but a substantial flow is desired and it would act to materially restrict flow under low pressures if it is designed to have the desired resistance in high pressures. I therefore provide a by-pass passage 22 having an outer wall thereof integral with and spaced from the valve body casing 5 and having a lateral port 23 opening through the valve body casing 5 to the inlet chamber 6. On low pressure installations this port is open and on high pressure installations it is closed. To accomplish this I provide a threaded plug 24 reversibly engageable in a threaded opening in the spaced outer wall of the by-pass 22 and longitudinally aligned with the port 23 and having an extension 27 at one end of such diameter as to enter the port 23. Both ends of the plug are slotted or provided with tool receiving kerfs 29. The nut 25 serves as a jamb nut and also to clamp the packing 28. When the plug is arranged with its extension 27 inwardly the structure is adapted for high pressure installations and when it is arranged with the extension outwardly as shown in Fig. 2 the structure is adapted for low pressure installation.

With this arrangement of parts, I provide a structure which can be quickly adjusted on an installation having relatively high pressure or one having relatively low pressure.

The structure illustrated is a very practical one.

Having thus described my invention, what I claim as new and desire to secure by Letters Patent, is:

1. In a valve mechanism adapted for use on relatively high or relatively low water pressure systems, the combination of a valve body casing having an inlet chamber and a discharge chamber having a cylindrically walled portion aligned with said inlet chamber, an inlet pipe disposed centrally of said cylindrically walled portion of said discharge chamber and having a discharge nipple projecting into said inlet chamber, the end of said nipple constituting a valve seat, an inlet valve coacting with said valve seat, a resilient concavo-convex combined discharge and return check valve mounted on said inlet pipe to coact with the walls of said cylindrically walled portion of said discharge chamber and acting to yieldably resist the discharge of fluid from said inlet chamber to said discharge chamber and to prevent back flow from said discharge chamber to said inlet pipe, a by-pass passage connecting said inlet chamber to said discharge chamber and having a wall thereof spaced from said valve body casing and having a port opening through said valve body casing to said inlet chamber, said spaced wall of said by-pass passage having a threaded opening therein aligned with said port, and a threaded plug longitudinally aligned with said port and reversibly engageable with said threaded opening, said plug having an extension at one end thereof, said extension being of the diameter of the by-pass port and disposed to project into said by-pass port when said plug is arranged with its said extension inwardly, said plug being provided with a lock nut, said plug extension when in said port opening closing the same, said plug when reversed being spaced from said port opening and permitting passage of fluid therethrough, said concavo-convex check valve constituting means to yieldingly retard flow from the inlet chamber to said discharge chamber and to act as a silencer when the port opening is closed by said extension and the valve mechanism is used in relatively high pressure systems, said plug when reversed to open said port opening permitting the fluid to freely flow through the port opening from the inlet chamber to the discharge chamber, and adapting the valve mechanism for use in relatively low pressure systems.

2. In a valve mechanism adapted for use on relatively high or relatively low water pressure systems, the combination of a valve body casing having an inlet chamber and a discharge chamber having a cylindrically walled portion aligned with said inlet chamber, an inlet pipe disposed centrally of said cylindrically walled portion of said discharge chamber and having a discharge nipple projecting into said inlet chamber, the end of said nipple constituting a valve seat, an inlet valve coacting with said valve seat, a resilient concavo-convex combined discharge and return check valve mounted on said inlet pipe to coact with the walls of said cylindrically walled portion of said discharge chamber and acting to yieldably resist the discharge of fluid from said inlet chamber to said discharge chamber and to prevent back flow from said discharge chamber to said inlet pipe, a by-pass passage connecting said inlet chamber to said discharge chamber and having a wall thereof spaced from said valve body casing and having a port opening through said valve body casing to said inlet chamber, said spaced wall of said by-pass passage having a threaded opening therein aligned with said port, and a threaded plug longitudinally aligned with said port and adapted for reversible engagement with said threaded opening, said plug at one end thereof having a closure for closing said port opening, said plug when reversed being spaced from said port opening and permitting passage of fluid therethrough, said resilient concavo-convex check valve constituting means to yieldingly retard flow from the inlet chamber to the discharge chamber and to act as a silencer when said closure closes said port opening and the valve mechanism is used in relatively high pressure systems, said plug when reversed to open the port opening permitting the fluid to freely flow therethrough from the inlet chamber to the discharge chamber and adapting the valve mechanism for use in relatively low pressure systems.

3. In a valve mechanism adapted for use on relatively high or relatively low water pressure systems, the combination of a valve body casing having an inlet chamber and a discharge chamber, an inlet valve for controlling the delivery to said inlet chamber, a resilient discharge valve disposed to yieldably resist the discharge of fluid from said inlet chamber to said discharge chamber, a by-pass for said discharge valve having a wall thereof spaced from said valve body casing and having a port opening through said valve body casing to said inlet chamber, said spaced wall of the by-pass having a threaded opening therein aligned with said port, and a plug longitudinally aligned with said port and having a head intermediate its ends and threaded on both sides of said head for selective reversible engagement with said threaded opening, one end of said plug being of such length as to close said by-pass port when the plug is arranged with such end inwardly, the other end of the plug being of such length as not to close the port when the plug is arranged with its said other end inwardly, said resilient discharge valve constituting means to yieldingly retard flow from the inlet chamber to the discharge chamber and to act as a silencer when the first named plug end closes said port and the valve mechanism is used with relatively high pressure systems, said plug when reversed and the second named plug end opens said port permitting the fluid to freely flow through the port from inlet chamber to the discharge chamber and adapting the valve mechanism for use with relatively low pressure systems.

4. In a valve mechanism adapted for use on relatively high or relatively low water pressure systems, the combination of a valve body casing having an inlet chamber and a discharge chamber, an inlet valve for controlling the delivery to said inlet chamber, a resilient flow retarding means between said inlet chamber and said discharge chamber, a by-pass passage for said flow retarding means having a wall thereof spaced from said valve body casing and having a port opening through said valve body casing to said inlet chamber, said spaced wall of the by-pass having a threaded opening therein aligned with said port, and a plug longitudinally aligned with said port and having a head intermediate its ends and threaded on both sides of its said head for selective reversible engagement with said threaded opening, one end of said plug being of such length as to close said by-pass port when the plug is arranged with such end inwardly, the other end of the plug being of such length as not to close the port when the plug is arranged with its said other end inwardly said resilient flow retarding means constituting means to yieldingly retard discharge from the inlet chamber to the discharge chamber and to act as a silencer when the first mentioned plug end closes said port, said plug when reversed and the second mentioned plug end opens said port permitting the fluid to freely flow through the port from the inlet chamber to the discharge chamber and adapting the valve mechanism for use with low pressure systems.

HERBERT D. CLEMMONS.

REFERENCES CITED

The following references are of record in the file of this patent:

UNITED STATES PATENTS

| Number | Name | Date |
|---|---|---|
| 68,704 | Cook | Sept. 10, 1867 |
| 527,346 | Rayner | Oct. 9, 1894 |
| 1,442,348 | McDermet | Jan. 16, 1923 |
| 1,483,392 | Spearing | Feb. 12, 1924 |
| 1,556,100 | Gondolf | Oct. 6, 1925 |
| 1,762,771 | Eble | June 10, 1930 |
| 1,918,959 | Culp | July 18, 1933 |
| 2,007,652 | Kocour | July 9, 1935 |
| 2,033,442 | Morris | Mar. 10, 1936 |
| 2,068,252 | Weber | Jan. 19, 1937 |
| 2,242,467 | Hamer | May 20, 1941 |
| 2,290,145 | Owens | July 14, 1942 |
| 2,382,500 | Owens | Aug. 14, 1945 |

FOREIGN PATENTS

| Number | Country | Date |
|---|---|---|
| 432,365 | France | 1911 |